2,989,489
HYDROCARBON CONVERSION CATALYST

Eugene F. Schwarzenbek, Montclair, N.J., assignor to The M. W. Kellogg Co., Jersey City, N.J., a corporation of Delaware
No Drawing. Filed Dec. 27, 1954, Ser. No. 477,925
5 Claims. (Cl. 252—466)

This invention relates to an improved method of manufacturing a catalyst containing a group VIII metal and/or a compound thereof and, more particularly, it is concerned with an improved method of distributing a group VIII metal and/or compound thereof throughout a carrier material in a uniform manner.

This a continuation-in-part of application, Serial No. 248,470, filed September 26, 1951, now U.S. Patent No. 2,760,940.

In the manufacture of a group VIII metal and/or compound thereof catalyst, there exists the problem of dispersing or distributing the catalytic agent onto the carrier material in order to produce a highly active catalyst. It is found that the simple procedure of employing an aqueous solution of the precursor material of the catalytic agent as the impregnant of the carrier material can be improved by the use of the dispersing agent of the present invention. A simple test to determine the extent of distribution or dispersion of the catalytic agent in the carrier material is to employ an aqueous solution for the purpose of impregnating granular or lump size carrier material and then following the usual treatment of drying with or without calcination, the interior of the carrier material is examined for any differences in color which tends to designate the extent or uniformity of dispersion of the catalytic material in the carrier. For example, with respect to platinum catalysts, it is noted, in some instances, that a heavy concentration of platinum is present on the surface of the catalyst and this is shown by a dark gray color; whereas the interior of the carrier material is substantially lighter in shade. It is believed that there is a correlation between the distribution of the catalytic element on the carrier material and its activity by virtue of the reduced catalytic surface which is exposed for reaction purposes. In the case where the catalytic agent is concentrated on a very small portion of the overall carrier material, the overall activity of the catalyst is less. Accordingly, the present invention provides an improved method for distributing a group VIII metal, or a compound thereof, on carrier materials.

An object of this invention is to provide an improved method for the preparation of a catalyst containing a group VIII metal or a compound thereof.

Another object of this invention is to provide an improved method of distributing a group VIII metal, or a compound thereof, throughout a carrier material.

Other objects and advantages of this invention will become apparent from the following description and explanation thereof.

The present invention comprises in one aspect, combining a compound of a group VIII metal, and an acyclic polyhydric alcohol in an aqueous medium and then combining the same with a carrier material for subsequent conversion to a finished catalyst containing a group VIII metal and/or a compound thereof supported on the carrier material.

For reasons not clearly understood, the acyclic polyhydric alcohol serves to improve the distribution of the catalytic agent throughout the carrier material. This effect is particularly pronounced in the case of impregnating a preformed carrier material, or one which has been previously dried or also calcined. The polyhydric alcohol serves as a dispersing agent when the precursor form of catalytic agent is combined with the carrier material in an aqueous medium. In view thereof, generally the acyclic polyhydric alcohol has a water solubility of at least about .05% by weight at 70° F. However, it is preferred that the solubility be greater because of the greater effectiveness of the dispersing agent in distributing the catalytic agent throughout the carrier material. Consequently, for the purpose of this specification and the appended claims, the water soluble acyclic polyhydric alcohol should be understood to be one which has the minimum solubility just mentioned. The acyclic polyhydric alcohol can be an aliphatic dihydric alcohol, an aliphatic trihydric alcohol, or an alcohol of the acyclic type having more than three hydroxyl groups attached to the carbon chain. More specifically, the alcohol can be an alkylene polyhydric alcohol, such as alkylene dihydric or trihydric alcohol. Specific examples of the polyhydric alcohols are ethylene glycol, glycerol, propylene glycol, erythroitol, sorbitol, inositol, and xylitol. For the purpose of this invention, the dispersing agent is used in an amount of about 1 to about 50% by weight, preferably, about 10 to about 40% by weight, based on the quantity of water which is used as the aqueous medium in the preparation of the catalyst.

In the preparation of the catalyst, the carrier material can be combined with the dispersing agent prior to mixing the aqueous medium of precursor catalytic agent. In this manner, the dispersing agent wets the carrier material throughout and subsequently causes the fixation or distribution of the catalytic agent in the precursor state throughout the support material. Alternatively, the aqueous medium of precursor catalytic agent is combined with the carrier material and subsequently the dispersing agent is added thereto. In the preferred method of catalyst preparation the dispersing agent is added to the aqueous medium of the precursor material of the catalytic agent and then the aqueous medium is employed to impregnate the carrier material. In any of the methods given above, the carrier material can be in a hydrous, dried, and/or calcined state. Following the mixing of the ingredients, the total mass is dried at a temperature not greater than about 400° F., and preferably about 200° to about 250° F., for a period of about 3 to about 50 hours. Following the drying treatment, the catalyst can be calcined at a temperature of at least about 450° F., more usually, at a temperature of about 600° to about 1500° F., preferably about 700° to about 1200° F., and for a period of about 1 to about 15 hours, more usually, about 2 to about 6 hours. The mixture of ingredients can be dried and calcined in a single operation and this can be accomplished by subjecting the same to an initial temperature of at least about 600° F. and for a period falling within the range defined hereinabove for the drying or the calcination treatment.

The carrier material to be used in the preparation of the catalyst for the present invention can be any support material which provides surface area for the deposition of the catalytic agent thereon. In the finished state, the carrier material is porous or foraminous. The support material can be an inorganic metal oxide of the gel or non-gel type just so long as it is suitable for use as a carrier material. Specific examples of carrier materials are: alumina, silica, magnesia, silica-alumina, activated charcoal, zinc aluminate spinel, kieselguhr, pumice, etc. The present invention is effective for the impregnation of carrier materials which have been previously dried, with or without subsequent calcination. The drying tretament of the carrier material results in a material of high surface area, and since it is difficult to distribute catalytic agent to the interior of the support, the present invention is especially effective to accomplish this purpose.

The catalytic agent of the catalyst is a group VIII metal or a compound thereof. Specific examples of the group VIII metals are: platinum, palladium, rhodium, cobalt, nickel, etc., or the compounds thereof, i.e., the oxides of the group VIII metals, such as, for example, cobalt oxide, platinum oxide, nickel oxide, iron oxide, etc. The catalytic agent is combined with the aqueous medium in the form of precursor material. In this connection, the precursor materials of the catalytic agents can be of the water soluble type. In this respect, the nitrates, the halides, or other similarly soluble salts or compounds of the catalytic agents, can be used as the precursor materials. In the case of the noble metals, e.g., platinum, palladium, etc., the precursor compound can be in the form of chloroplatinic or chloropalladic acid, and the ammine complex. The precursor compound is water soluble for the purpose of this invention, if it possesses a solubility of 0.05 gram per 100 grams of water at 70° F. In general, the precursor compound is added to the aqueous medium in an amount sufficient to provide the desired concentration of the catalytic agent in the finished catalyst. Accordingly, the group VIII metal, or compound thereof, can comprise about 0.05 to about 20% by weight, based on the total catalyst. In the case of the noble metals, it is preferred that the precursor compound be added in an amount sufficient to provide a finished catalyst containing about 0.01 to about 5% by weight, preferably 0.1 to about 1% by weight of the noble metal, based on the total catalyst.

The catalyst prepared by the method of the present invention is useful in a variety of reactions, primarily processes involving the conversion of hydrocarbons, such as hydroforming, desulfurization, hydrogenation, dehydrogenation, isomerization, isoforming, etc. The hydrocarbon reactant is contacted with the catalyst at a temperature of about 400° to about 1200° F., a pressure of about one atmosphere to about 2500 p.s.i.g., and a weight space velocity of about 0.1 to about 30. The catalysts of the noble metals are particularly effective for the hydroforming of light hydrocarbon oils, e.g., naphtha, or gasoline The light hydrocarbon oil is contacted with the catalyst at a temperature of about 800° to about 1000° F., a pressure of about 50 to about 750 p.s.i.g., a weight space velocity of about 0.5 to about 15, and in the presence of added hydrogen in the amount of about 2500 to about 15,000 standard cubic feet of hydrogen (measured at 60° F. and 760 mm. Hg) per barrel of oil feed.

In order to provide a better understanding of the present invention, reference will be had to the following specific examples.

Example I 12.5 grams of chloroplatinic acid (40% Pt) are added to 880 cc. of water. To the solution of chloroplatinic acid there are added 120 grams of ethylene glycol. The resultant solution is used for the impregnation of alumina gel in an amount of 1000 grams of anhydrous alumina. Following the addition of the chloroplatinic acid and ethylene glycol to the alumina gel, the impregnated alumina is dried at a temperature of 240° F. for a period of 24 hours. The dried alumina is subsequently calcined at a temperature of 1000° F. for a period of 3 hours. Following the calcination treatment, the interior of the alumina is examined and it is to be noted that a homogeneous gray color is present therein.

Example II

For the purpose of comparison, a platinum catalyst is prepared in a similar manner as given above, except that ethylene glycol is not used. In this connection, it is noted that there is a tendency for the platinum to concentrate on the outer surface of the alumina, as is shown by the fact that the interior of the alumina is lighter in color than the outer parts thereof.

Example III

A catalyst is prepared in accordance with the procedure of Example I, except that platinum tetramine chloride is employed. The same result of good distribution is obtained.

Having thus provided a written description of my invention along with a specific example thereof, it should be understood that no undue limitations or restrictions are to be imposed by reason thereof, but that the scope of the present invention is defined by the appended claims.

I claim:
1. A process which comprises combining water, an acyclic polyhydric alcohol having a water solubility of at least about 0.05 percent by weight at 70° F. in an amount of between about 1 and about 50 percent by weight based on the weight of water, a carrier material, and a water soluble compound selected from the group consisting of a chloroacid and an ammine complex of a metal selected from the group consisting of platinum and palladium in an amount sufficient to provide a finished catalyst containing between about 0.01 and about 20 percent by weight of said metal, and then heating the mixture including said water soluble compound of said metal to produce the finished catalyst.

2. A process which comprises combining water, an acyclic dihydric alcohol having a water solubility of at least about 0.05 percent by weight at 70° F. in an amount of between about 1 and about 50 percent by weight based on the weight of water, a water soluble compound selected from the group consisting of chloroplatinic acid and a platinum ammine complex in an amount sufficient to provide a finished catalyst containing between about 0.01 and about 5 percent by weight of platinum, employing the solution to impregnate a porous carrier material, and heating the carrier material impregnated with said water soluble platinum compound to produce a platinum residue on the carrier material.

3. A process which comprises combining water, an acyclic dihydric alcohol having a water solubility of at least about 0.05 percent by weight at 70° F. in an amount of between about 10 and about 40 percent by weight based on the weight of water, a water soluble compound selected from the group consisting of chloroplatinic acid and a platinum ammine complex in an amount sufficient to provide a finished catalyst containing between about 0.01 and about 5 percent by weight of platinum, employing the solution to impregnate a porous carrier material, and then drying the mixture including said water soluble compound of platinum at a temperature not greater than about 400° F., and calcining the dried mixture at a temperature between about 700° F. and about 1200° F. to produce a platinum residue on the carrier material.

4. A process which comprises combining water, ethylene glycol in an amount of between about 10 and about 40 percent by weight based on the weight of water, alumina, and chloroplatinic acid in an amount sufficient to provide a finished catalyst containing between about 0.01 and about 5 percent by weight platinum and then drying the mixture including said chloroplatinic acid at a temperature not greater than about 400° F., and calcining the dried mixture at a temperature between about 700° F. and about 1200° F. to produce a platinum on alumina catalyst.

5. A process which comprises combining water, ethylene glycol in an amount of between about 10 and about 40 percent by weight based on the weight of water, alumina, and platinum tetrammine chloride in an amount sufficient to provide a finished catalyst containing between about 0.01 and about 5 percent by weight platinum and then drying the mixture including said platinum tetrammine chloride at a temperature not greater than about 400° F., and calcining the dried mixture at a temperature between about 700° F. and about 1200° F. to produce a platinum on alumina catalyst.

References Cited in the file of this patent

UNITED STATES PATENTS

| | | |
|---|---|---|
| 1,956,585 | Oglesby et al. | May 1, 1934 |
| 2,162,276 | Swiss | June 13, 1939 |
| 2,385,469 | Salley | Sept. 25, 1945 |
| 2,486,361 | Nahin | Oct. 25, 1949 |
| 2,611,749 | Haensel | Sept. 23, 1952 |
| 2,623,860 | Haensel | Dec. 30, 1952 |

FOREIGN PATENTS

| | | |
|---|---|---|
| 343,285 | Great Britain | Feb. 19, 1931 |
| 594,463 | Great Britain | Apr. 11, 1942 |